United States Patent
Nelson et al.

(10) Patent No.: US 11,032,434 B2
(45) Date of Patent: Jun. 8, 2021

(54) DEVICES, SYSTEMS, AND RELATED METHODS FOR VISUAL INDICATION OF AN OCCURRENCE OF AN EVENT

(71) Applicant: SORENSON IP HOLDINGS LLC, Salt Lake City, UT (US)

(72) Inventors: Mark Nelson, West Jordan, UT (US); Doug Reynolds, Clinton, UT (US)

( * ) Notice: Subject to any disclaimer, the term of this patent is extended or adjusted under 35 U.S.C. 154(b) by 0 days.

(21) Appl. No.: 16/406,926

(22) Filed: May 8, 2019

(65) Prior Publication Data

US 2020/0358910 A1 Nov. 12, 2020

(51) Int. Cl.
| | |
|---|---|
| *H04M 19/00* | (2006.01) |
| *H04M 19/04* | (2006.01) |
| *G08B 5/36* | (2006.01) |
| *H04N 7/14* | (2006.01) |

(52) U.S. Cl.
CPC ............ *H04M 19/048* (2013.01); *G08B 5/36* (2013.01); *H04N 7/147* (2013.01)

(58) Field of Classification Search
CPC ........ H04M 19/048; G08B 5/36; H04N 7/147
See application file for complete search history.

(56) References Cited

U.S. PATENT DOCUMENTS

| | | | |
|---|---|---|---|
| 5,946,636 A | 8/1999 | Uyeno et al. | |
| 6,016,038 A | 1/2000 | Mueller et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,340,868 B1 | 1/2002 | Lys et al. | |
| 6,459,919 B1 | 10/2002 | Lys et al. | |
| 6,528,954 B1 | 3/2003 | Lys et al. | |
| 6,577,080 B2 | 6/2003 | Lys et al. | |
| 6,608,453 B2 | 8/2003 | Morgan et al. | |
| 6,690,955 B1 | 2/2004 | Komiyama | |
| 6,717,376 B2 | 4/2004 | Lys et al. | |
| 6,720,745 B2 | 4/2004 | Lys et al. | |
| 6,788,011 B2 | 9/2004 | Mueller et al. | |
| 6,806,659 B1 | 10/2004 | Mueller et al. | |
| 6,888,322 B2 | 5/2005 | Dowling et al. | |
| 6,897,624 B2 | 5/2005 | Lys et al. | |
| 6,937,812 B2 * | 8/2005 | Schladenhauffen ........................ G02B 6/12002 385/134 |
| 6,975,079 B2 | 12/2005 | Lys et al. | |
| 7,085,358 B2 | 8/2006 | Ruckart | |
| 7,135,824 B2 | 11/2006 | Lys et al. | |
| 7,186,003 B2 | 3/2007 | Dowling et al. | |

(Continued)

FOREIGN PATENT DOCUMENTS

| | | |
|---|---|---|
| EP | 1324578 A2 | 7/2003 |
| GB | 2383716 A | 7/2003 |
| WO | 20031077505 A2 | 9/2003 |

*Primary Examiner* — Khai M Nguyen

(57) ABSTRACT

Devices, systems, and methods are described for visually indicating an occurrence of an event. A visual indicator device is described for connection to a video communication device, the visual indicator device comprises a transparent housing, a printed circuit board having a plurality of light sources mounted thereon, and a light pipe positioned within the transparent housing between a back surface of the transparent housing and the printed circuit board, the light pipe having a flat surface and an angled surface having a range between 30° to 45° relative to the flat surface.

19 Claims, 10 Drawing Sheets

(56) References Cited

U.S. PATENT DOCUMENTS

| | | |
|---|---|---|
| 7,231,060 B2 | 6/2007 | Dowling et al. |
| 7,242,152 B2 | 7/2007 | Dowling et al. |
| 7,352,339 B2 | 4/2008 | Morgan et al. |
| 7,385,359 B2 | 6/2008 | Dowling et al. |
| 7,443,964 B2 | 10/2008 | Urban et al. |
| 7,610,044 B2 | 10/2009 | Sindoni |
| 7,642,730 B2 | 1/2010 | Dowling et al. |
| 7,764,026 B2 | 7/2010 | Dowling et al. |
| 7,769,141 B2 | 8/2010 | Cupal et al. |
| 7,929,675 B2 | 4/2011 | Ruckart |
| 8,688,161 B2 | 4/2014 | Kies et al. |
| 2002/0183098 A1* | 12/2002 | Lee .................. H04M 1/57 455/566 |
| 2002/0196913 A1 | 12/2002 | Ruckart |
| 2003/0228003 A1 | 12/2003 | Vardon |
| 2007/0112977 A1 | 5/2007 | Hornal et al. |
| 2008/0167995 A1 | 7/2008 | Cue et al. |
| 2011/0065321 A1 | 3/2011 | Wang |
| 2014/0270099 A1* | 9/2014 | Winsor ............ H04M 3/42391 379/52 |
| 2016/0119459 A1* | 4/2016 | Clementson ......... G02B 6/0045 379/396 |
| 2018/0286201 A1* | 10/2018 | Lemberger ............ H04W 60/04 |

\* cited by examiner

DEVICES, SYSTEMS, AND RELATED METHODS FOR VISUAL INDICATION OF AN OCCURRENCE OF AN EVENT

TECHNICAL FIELD

The application relates to visual indication of an occurrence of an event and, more particularly, to visual indication of an occurrence to a hearing-impaired person.

BACKGROUND

The use of indicators for identifying the activation of a communication device is commonplace. One predominant form of indicators utilizes an audible or sound-based mechanism for providing notification to a user, such as the audible ringing of a phone. However, some persons may have impaired hearing capabilities and may even be completely deaf to such audible indicators. Accordingly, such individuals are at a distinct disadvantage to detect and respond to such audible indicators for communication devices. Visual indicators have been developed for hearing-impaired users, or in environments that are not conducive to audible indicator detection. One known visual indication approach utilized by hearing-impaired users for identifying an incoming telephone call includes connecting a conventional telephone through a coupling circuit to a room lamp or other light source. Other wireless connections between the communication device and light sources have also been used. Responsive to detection of an incoming call to the communication device, the communication device may also send a control signal to the connected light source to visually "ring," such as by causing the light source (e.g., lamp, overhead light, etc.) to flash repeatedly to attract attention of the hearing-impaired users. Such a light source may also be referred to as a "visual indicator" or as a "flasher."

BRIEF SUMMARY

In some embodiments, the disclosure includes a visual indicator device for connection to a video communication device. The visual indicator device comprises a transparent housing, a printed circuit board having a plurality of light sources mounted thereon, a light pipe positioned within the transparent housing between a back surface of the transparent housing and the printed circuit board, and the light pipe having a flat surface and an angled surface having a range between 30° to 45° relative to the flat surface.

In some embodiments, the disclosure includes a visual indicator system comprising a video communication device and a visual indicator device. The video communication device is configured to receive an incoming call and transmit a control signal in response thereto. The visual indicator device is configured to generate a light pattern with a plurality of lights mounted on a backward facing circuit board within a translucent housing responsive to the control signal, and guide light from the light pattern through a light pipe to exit primarily through a side of the translucent housing.

In some embodiments, the disclosure includes a method of generating a visual notification responsive to an incoming call. The method comprises receiving an incoming call at a video communication device configured for use by a hearing-impaired user, transmitting a control signal to a visual indicator device responsive to the incoming call, generating a light pattern with a plurality of light sources within a housing of the visual indicator device, and guiding the light pattern with a light pipe having a flat surface and an angled surface to exit the housing primarily through a side surface thereof.

DETAILED DESCRIPTION

Figure 1:
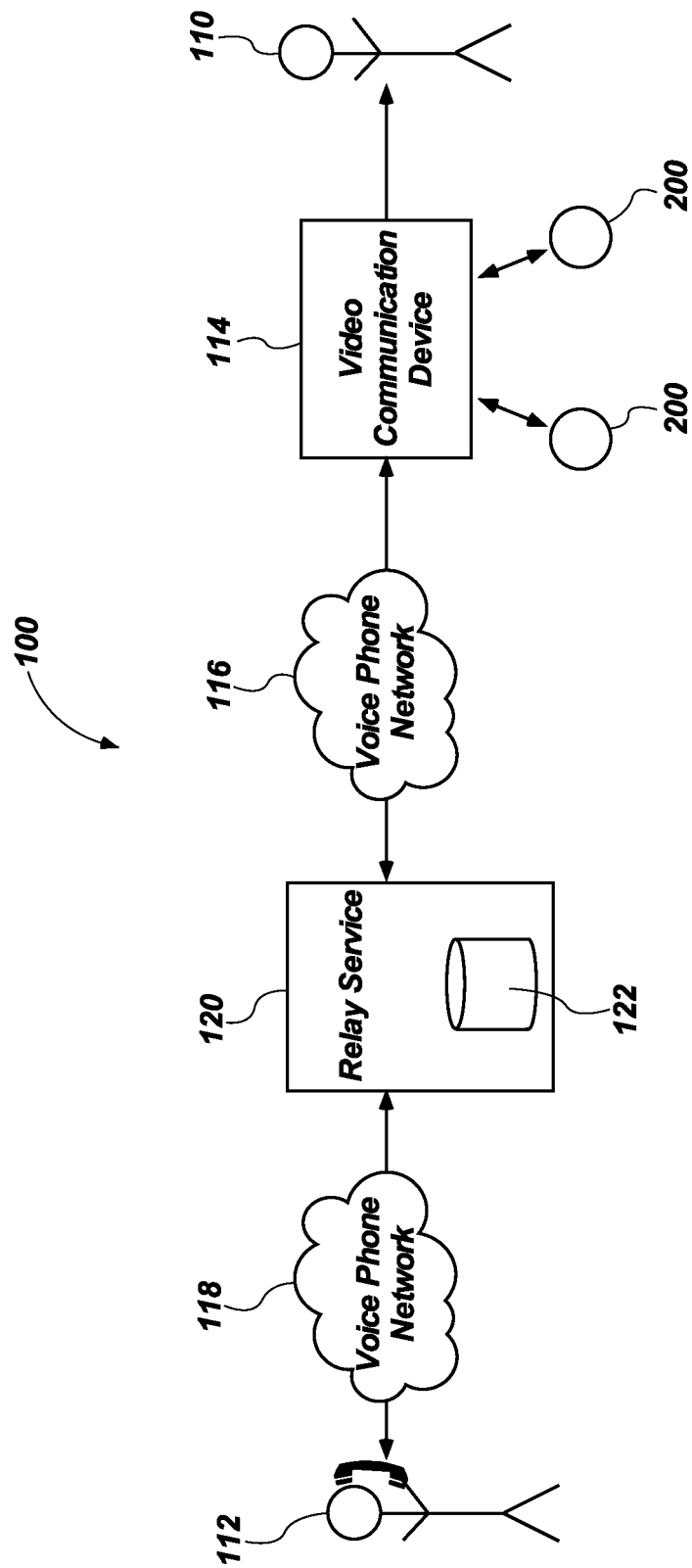
FIG. 1 is a simplified schematic diagram of a hearing-impaired communication system according to an embodiment of the disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not necessarily meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The term "incoming call" refers to an incoming communication to a communication device such as a portable communication device as well as less portable audio and video communication devices. This incoming communication should be considered to include communications such as, for example, E-mail, text messages, instant messages, voice communications, and video communications.

Embodiments of the disclosure include systems and related methods for visually indicating an occurrence of an event. It should be noted that while the utility and application of the various embodiments of the disclosure are described with reference to a hearing-impaired environment, the disclosure also finds application to any environment where visually indicating an occurrence of an event may be helpful or desirable.

FIG. 1 is a simplified schematic diagram of a hearing-impaired communication system 100 configured to facilitate a communication session between a hearing-impaired user 110 and a hearing-capable user 112 with the assistance of a sign language interpreter of a video relay service 120 according to an embodiment of the disclosure. The video relay service 120 enables a hearing-impaired user 110 to utilize a video communication device 114 to engage in conversation through a voice-based communication system with a hearing-capable user 112. A communication session between the users 110, 112 is facilitated through the use of various equipment through one or more networks. For example, a communication session may include establishing a first connection (e.g., over a voice phone network 118) between the device associated with the hearing-capable user 112 and the video relay service 120, and establishing a second connection (e.g., over a video phone network 116) between the video relay service 120 and the video communication device 114 associated with the hearing-impaired user 110. In some embodiments, the video phone network 116 may include an internet-based communication network, cellular networks, or other suitable network for facilitating video communication with the video relay service 120. The voice phone network 118 may include a Public Switch Telephone Network (PSTN) or other communication network suitable for facilitating voice communication with the video relay service 120 (e.g., including internet-based networks and/or cellular networks).

The video relay service 120 may be configured to facilitate communication sessions for a number of different users of the communication system 100. Thus, the video relay service 120 may include a user account database 122 that manages user profile information including devices assigned the various users of the system 100, such as user profile information (e.g., name, address, contact information, etc.) and device information (e.g., identifiers unique to each assigned device, additional VRS-assigned unique device identifiers, VRS-assigned group identifiers, etc.) Other databases (e.g., routing databases) may also be included as needed to facilitate communication sessions. Although FIG. 1 depicts a situation in which a communication session is facilitated between the hearing-impaired user 110 and a hearing-capable user 112, the communication system 100 may also be configured to enable point-to-point communication sessions between hearing-impaired users. Such a call may not require a sign language interpreter as each party to the call may be able to effectively communicate via sign language. Thus, incoming calls to the video communication device 114 may originate from hearing-capable users 112 or other hearing-impaired users 110.

To interface the video communication device 114 into a generally voice-based communication system, interpretive services are employed by the video relay service 120 allowing hearing-impaired users 110 to communicate with an interpreter, namely through sign language. The sign language images are then translated by the video relay service 120 and, when translated into voice information, are then forwarded over a voice-based communication connection to the hearing-capable user 112. The video communication device 114 is configured to relay the communicative expressions of a hearing-impaired user 110 within the hearing-impaired communication system. For example, the video communication device 114 may be configured to capture (e.g., with a camera) the communicative expressions exhibited by the hearing-impaired user 110 and to display (e.g., with an electronic display) interpreted information originating from the hearing-capable user 112 through the video relay service 120. The expressions, such as sign language and/or body language, may be interpreted or translated by video relay service 120. The hearing-capable user 112 interacts in a conventional manner with video relay service 120 through the use of a voice-based dialogue conveyed over a conventional voice phone.

A video communication device 114 associated with a hearing-impaired user may be assigned a unique identifier (ID) (e.g., phone numbers). In the VRS environment, each individual video communication device 114 may be assigned its own unique ID to which calls may be placed through the video relay service 120. For example, the hearing-impaired user may have a tablet computer having a first unique ID, a standalone video phone having a second unique ID, and another standalone video phone having a third unique ID. Thus, a call placed to the first unique ID may be routed to the tablet computer to the exclusion of the hearing-impaired user's other devices.

The hearing-impaired communication system 100 may further include one or more visual indicators 200 (also referred to as "flashers") that may be configured to generate a visual indication of an incoming call to attract the attention of the video communication device. In some embodiments, a single visual indicator device 200 may be associated with a single video communication device 114 such that when an incoming call is placed to the single video communication device 114, the associated visual indicator device 200 may light up (e.g., flash). In some embodiments, multiple visual indicators 200 may be associated with a single video communication device 114 such that when an incoming call is placed to the single video communication device 114, multiple associated visual indicators 200 may light up. In some embodiments, a single visual indicator device 200 may be associated with multiple video communication devices 114 such that when an incoming call is placed to any of the associated video communication devices 114, multiple visual indicators 200 may light up.

In some embodiments, a single visual indicator device 200 may be associated with multiple video communication devices 114 such that when an incoming call is placed to any of the associated video communication devices 114, the visual indicators 200 may light up. For example, a hearing-impaired user may own multiple video communication devices that may be linked to a visual indicator. The visual indicator may light up in a particular way (e.g., pattern and/or color) to distinguish between which video communication device is actually receiving the call (i.e., the "callee"). Additional details of such a callee ID system is described in U.S. patent application Ser. No. 15/794,896, filed Oct. 26, 2017, and entitled "Systems and Related Methods for Visual Indication of Callee ID Information for an Incoming Communication Request in a Hearing-Impaired Environment," the disclosure of which is hereby incorporated in its entirety herein by this reference. In some embodiments, the visual indication may also be indicative of a caller ID such as providing a different pattern and/or color assigned to a particular caller. An example of a system that provides an improved visual indication of the origin of incoming calls (i.e., caller ID) is described in U.S. Pat. No. 7,769,141 to Cupal et al., issued Aug. 3, 2010, the disclosure of which is hereby incorporated in its entirety herein by this reference.

The visual indicators 200 and the associated video communication device(s) 114 maybe coupled wirelessly over a network. For example, the video communication device 114 may send and receive control signals to the visual indicator device 200 through any wireless communication link such as a mobile data network, infrared link, Bluetooth, Bluetooth Low Energy (BLE), Zigbee, and similar wireless communication methods and protocols. Additional details regarding networks of visual indicators are described in U.S. Pat. No. 8,976,940, filed Nov. 27, 2013, and issued Mar. 20, 2015, and U.S. Pat. No. 8,824,640, filed Mar. 12, 2013, and issued Sep. 2, 2014, the disclosure of each of which is hereby incorporated in their entirety herein by this reference.

Figure 2:
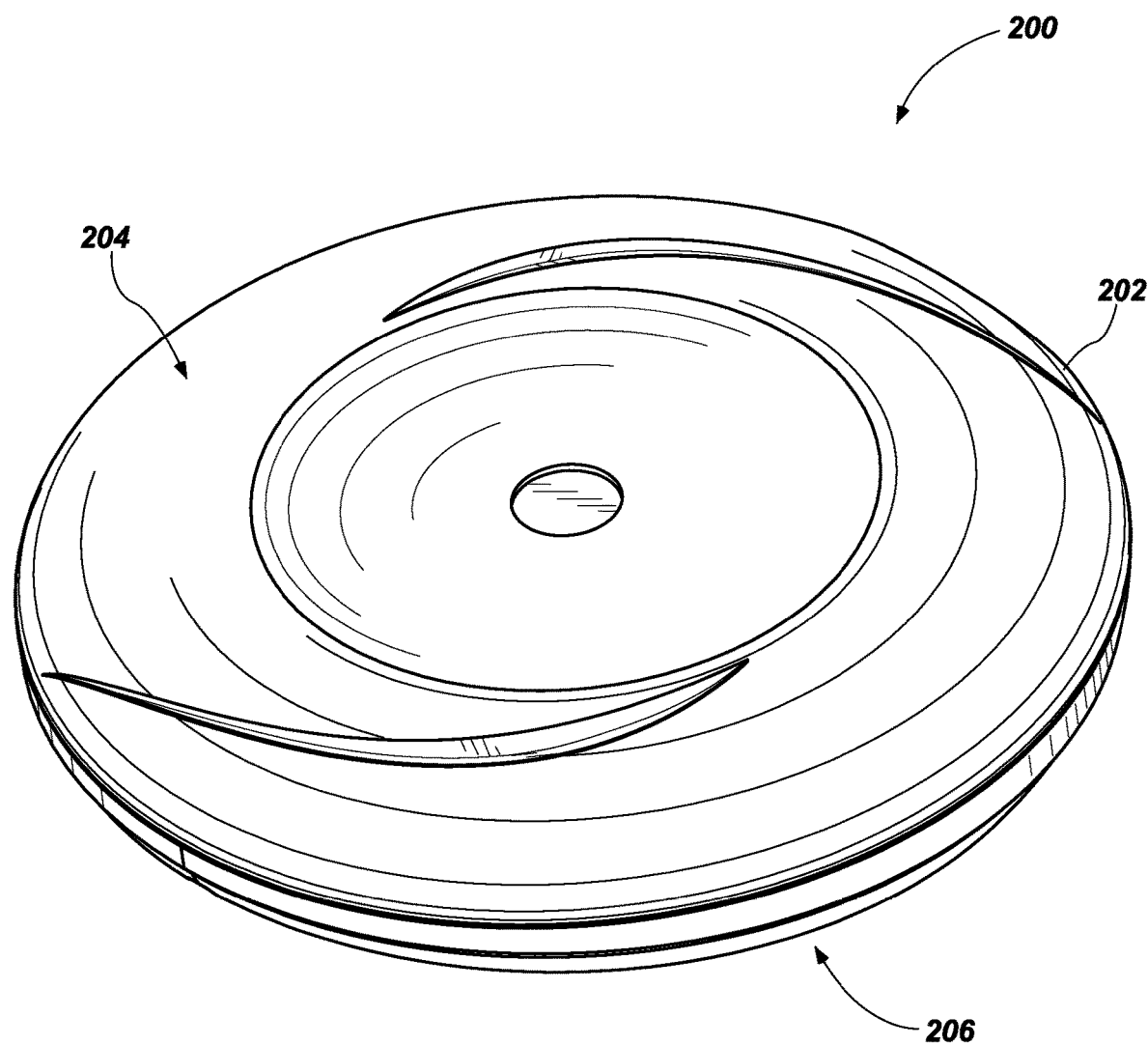
FIG. 2 is a perspective view of a visual indicator according to an embodiment of the disclosure.

FIG. 2 is a perspective view of a visual indicator device 200 according to an embodiment of the disclosure. The visual indicator device 200 may be the visual indicator device 200 of FIG. 1. The visual indicator device 200 may include a transparent housing 202 that is configured to house the electronics of the visual indicator device 200. The transparency of the transparent housing 202 may enable the light sources housed within the visual indicator device 200 to project light externally to attract the attention of the hearing-impaired user. The transparent housing 202 may be formed from a material that refracts light and exhibits a robust elasticity. As a non-limiting embodiment, the transparent housing 202 may be formed from a transparent plastic material such as a polycarbonate material (e.g., MAKROLON®).

The transparent housing 202 may also have an upper portion 204 and lower portion 206 that may be configured to separate from each other to provide access to the internal electronics of the visual indicator device 200. In other words, the upper portion 204 and the lower portion 206 may be detachably coupled with each other (e.g., via snap fit, fastener, or other coupling mechanism).

Figure 3:
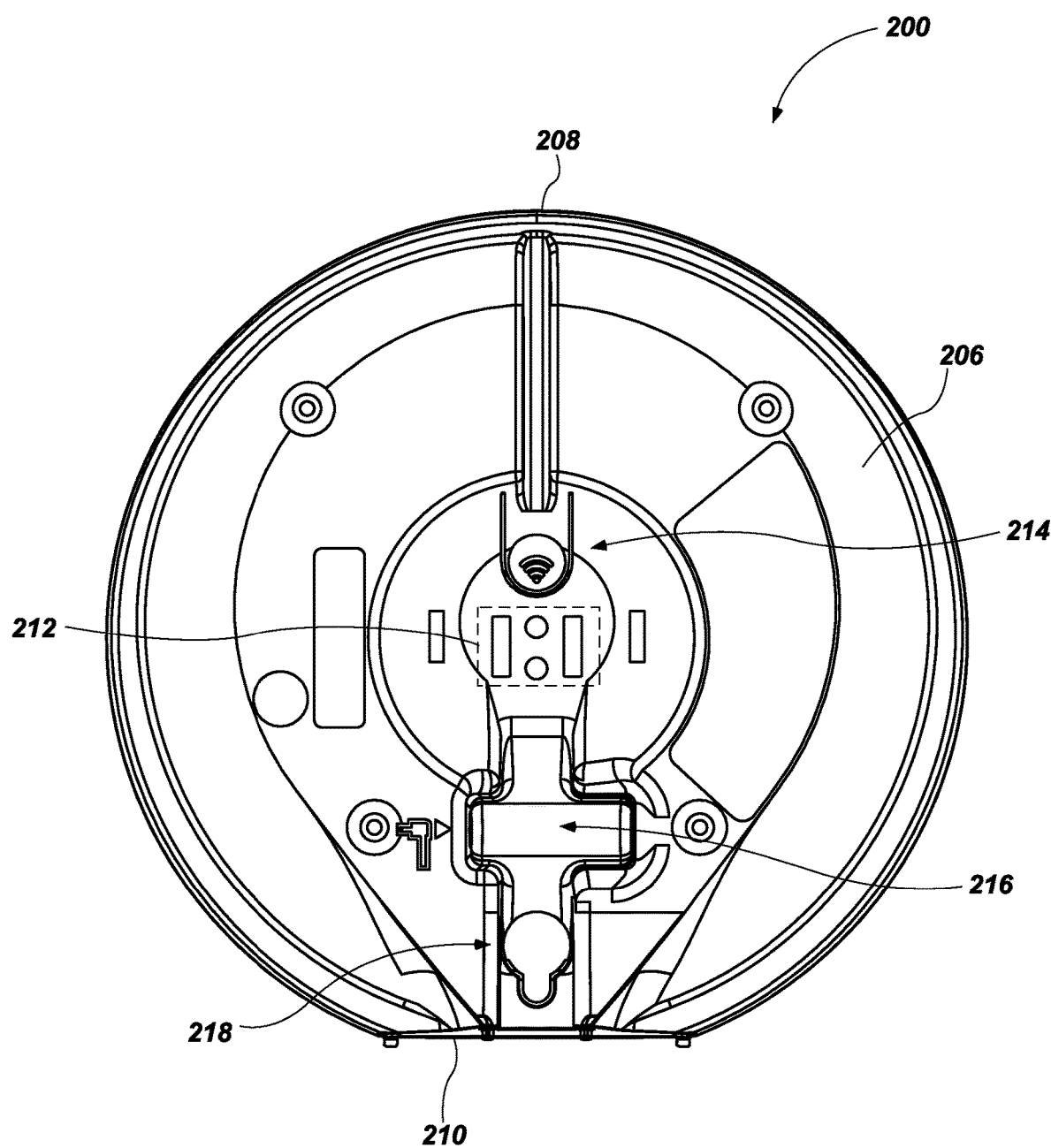
FIG. 3 is a backside view of the visual indicator showing the back of the lower portion 206 of the transparent housing.

FIG. 3 is a backside view of the visual indicator device 200 showing the back of the lower portion 206 of the transparent housing 202. The transparent housing 202 may have a generally circular shape. In particular, the transparent housing 202 may have a rounded shape at its top portion 208 and have a flat base at its bottom portion 210. The generally flat bottom portion 210 may enable the visual indicator device 200 to stand upright on a table or other horizontal surface as desired by the hearing-impaired user. In such a configuration, the backside of the visual indicator device 200 may face the horizontal surface. In some embodiments, the transparent housing 202 may also provide a wall mount slot configured to enable the hearing-impaired user to mount the visual indicator device 200 to a vertical surface with the backside of the visual indicator device 200 facing the vertical surface. In either configuration, the light sources within the transparent housing 202 may be directed outward from the backside to project on the horizontal surface or the vertical surface supporting the visual indicator device 200 as the case may be. Directing the light outward from the backside of the transparent housing 202 may enable the light sources to have a higher intensity directed toward the respective surface without directing the light into the eyes of the hearing-impaired user.

The backside of the transparent housing 202 may include cavities and other apertures to provide access to various components of the visual indicator device 200. For example, switches 212 may be accessible and operable from the backside of the visual indicator device 200. The switches 212 may be configured to control the intensity of the light sources located within the transparent housing 202. The switches 212, as shown, may be configured as slider switches; however, other configurations and locations of the switches 212 are contemplated. A power port 216 may also be provided in the lower portion 206 of the transparent housing 202 to provide access for the power cord to couple and provide power from the DC power supply to the visual indicator device 200. In some embodiments, a battery may be included in place of, or in addition to, the power port 216. The backside of the transparent housing 202 may also include a pairing button 214 configured to connect (e.g., link, pair, etc.) the visual indicator device 200 to an associated video communication device. The backside of the transparent housing 202 may also include a wall mount connector 218 for mounting to a vertical surface.

Figure 4:
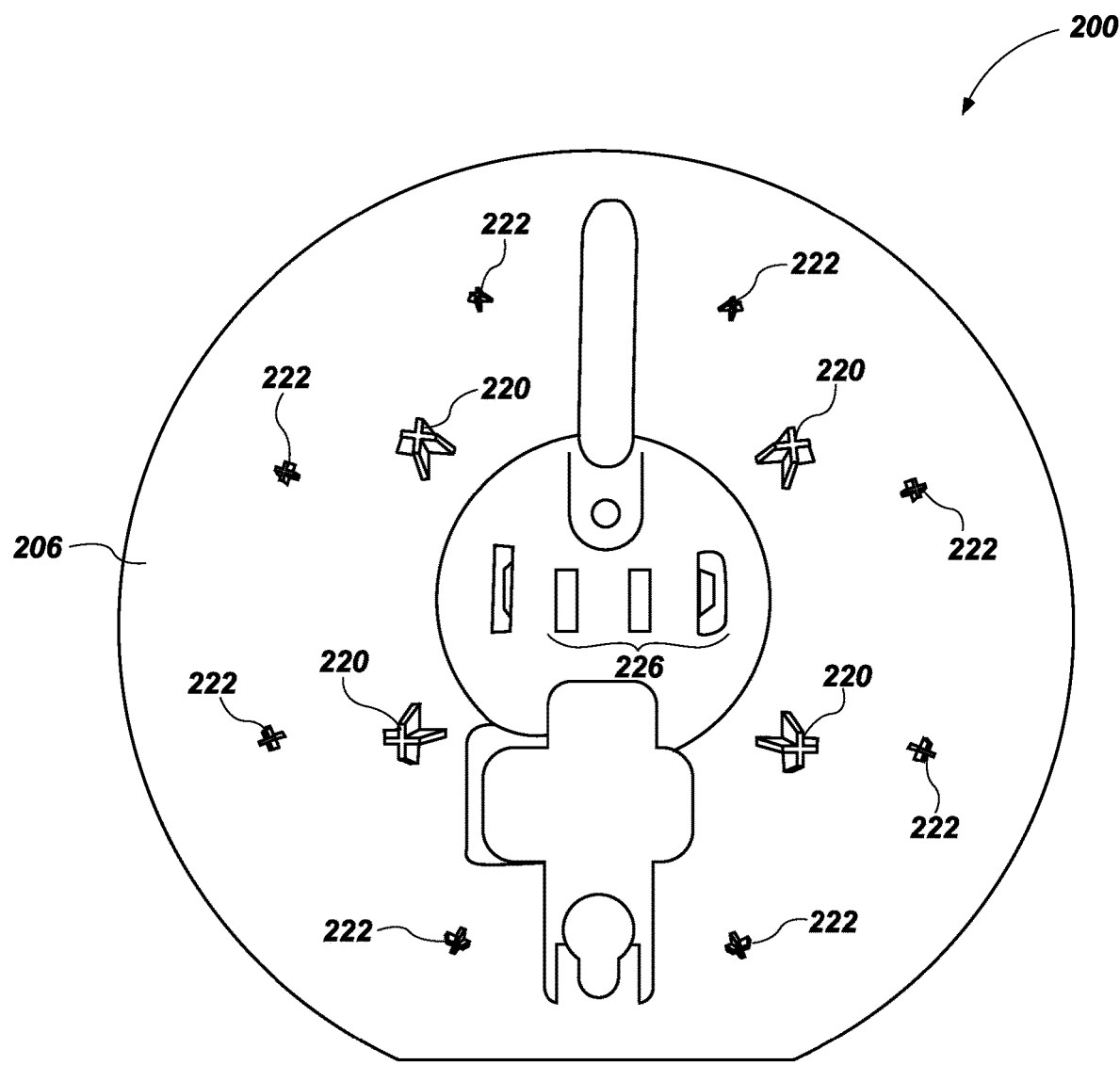
FIG. 4 is a top view of the lower portion of the transparent housing of the visual indicator of FIG. 2.

FIG. 4 is a top view of the lower portion 206 of the transparent housing 202 of the visual indicator of FIG. 2. In this view, the upper portion 204 of the transparent housing 202 and other contents of the visual indicator device 200 have been removed. The internal cavity of the lower portion 206 may include multiple platforms 220 that may acting as standoffs and configured to provide a resting spot for the printed circuit board. The internal cavity may also include multiple posts 222 spaced around the periphery of the lower portion 206 of the transparent housing 202. The posts 222 may provide a complementary male/female connection with the light pipe (not shown in FIG. 4) to secure the light pipe. The light pipe is a wave guide configured to channel light from the light sources and will be described more fully below. The lower portion 206 may also include apertures 226 that are configured to receive the intensity switches 212 discussed above.

Figure 5:
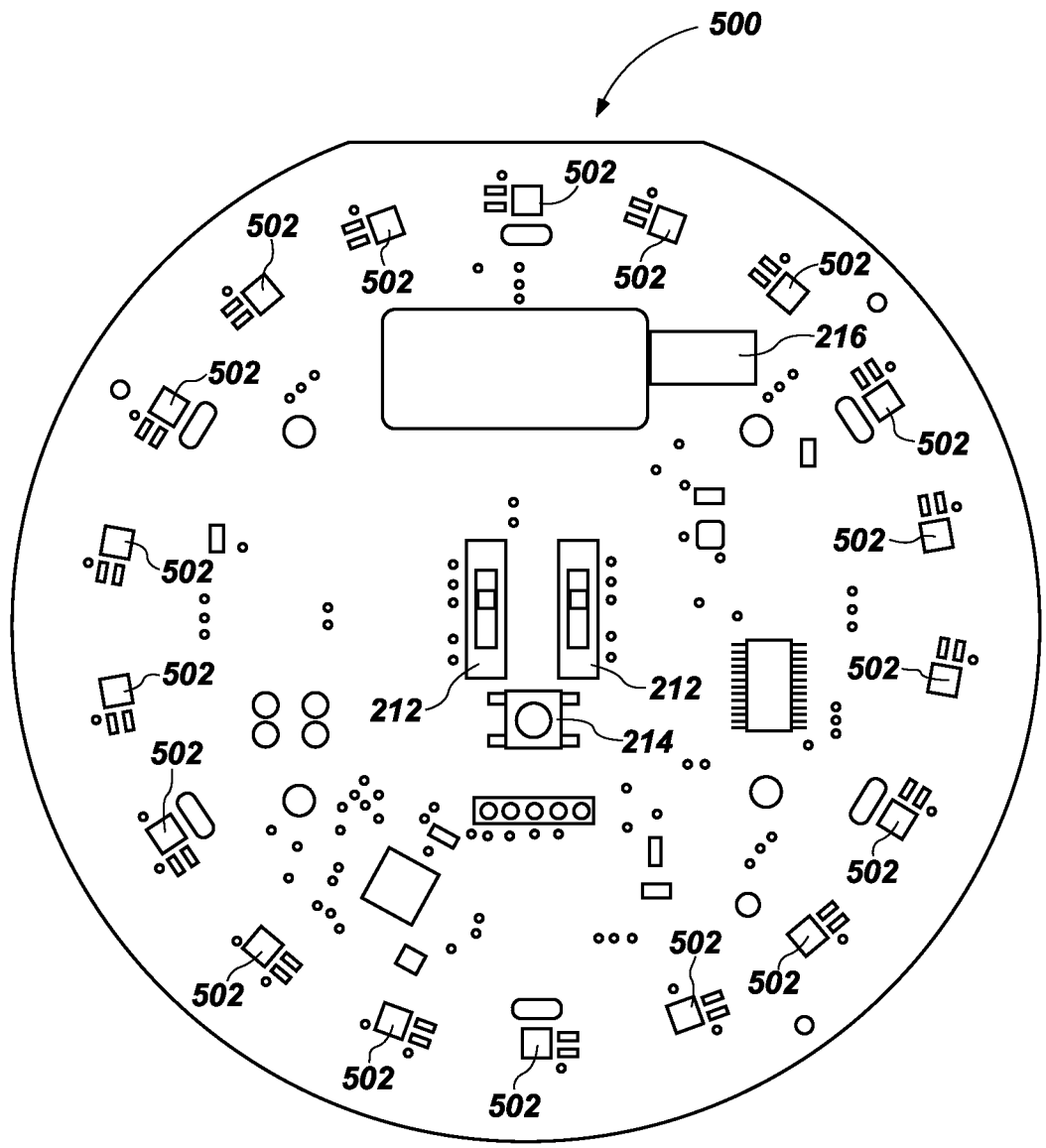
FIG. 5 is a top view of the printed circuit board (PCB) with the electronics of the visual indicator device of FIG. 2.

FIG. 5 is a simplified top view of the printed circuit board (PCB) 500 with the electronics of the visual indicator device 200 of FIG. 2. Not all components are described herein, such as a processor, memory, etc. The memory may include a table (e.g., a lookup table) configured to provide the instructions for the processor to control the light sources 502 according to the signal received by the video communication device.

It is noted that the light sources 502 may be mounted on the periphery of the PCB 500. These light sources 502 may be red green blue (RGB) light emitting diodes (LEDs) that are controllable to provide the visual indication of the incoming call. Near the middle of the PCB 500 are the switches 212 discussed above, which may be inserted into the apertures 226 of the backside of the lower portion 206 of the transparent housing 202.

Figure 6A:
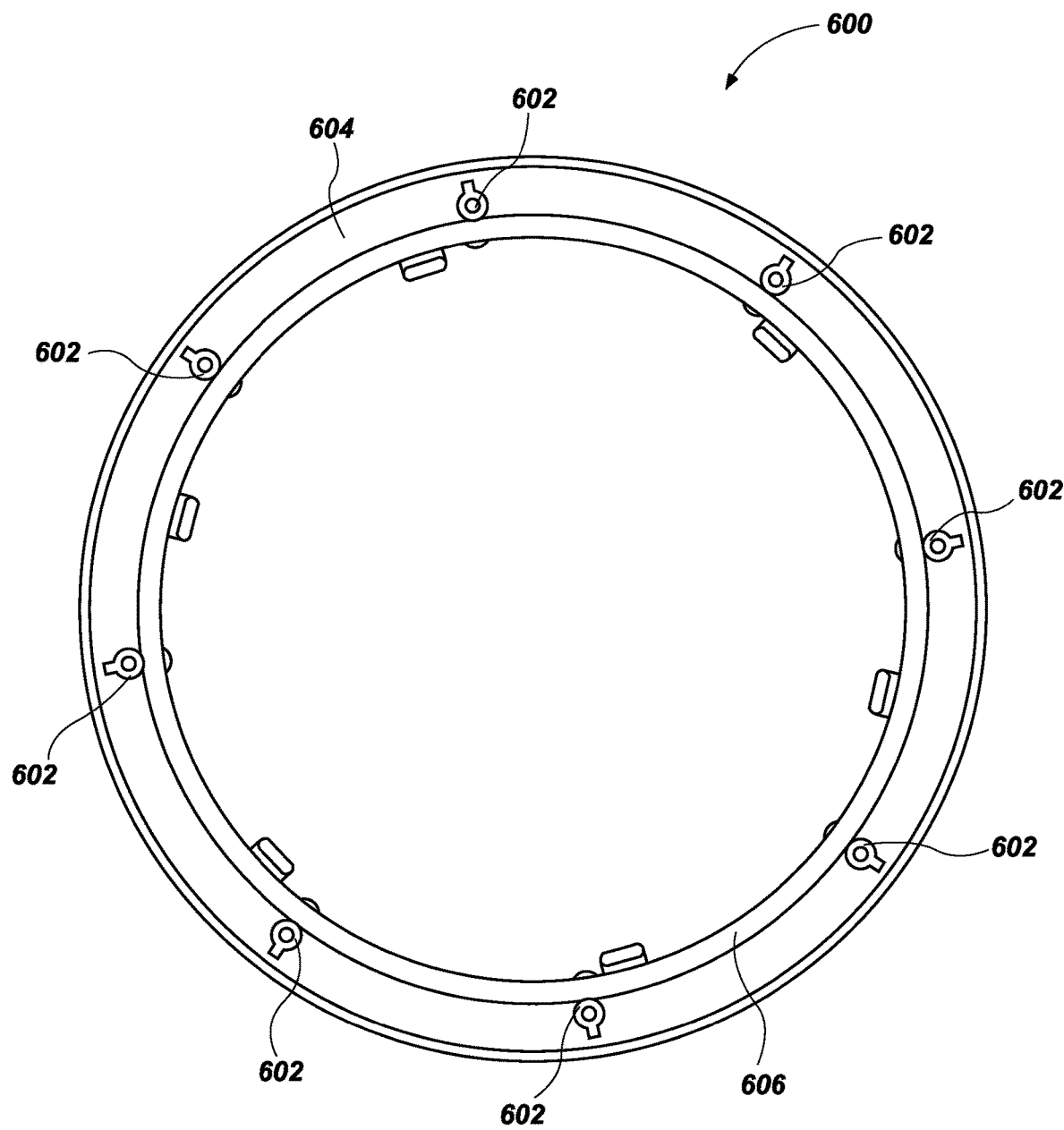
FIG. 6A is a top view of a light pipe according to an embodiment of the disclosure.
Figure 6B:
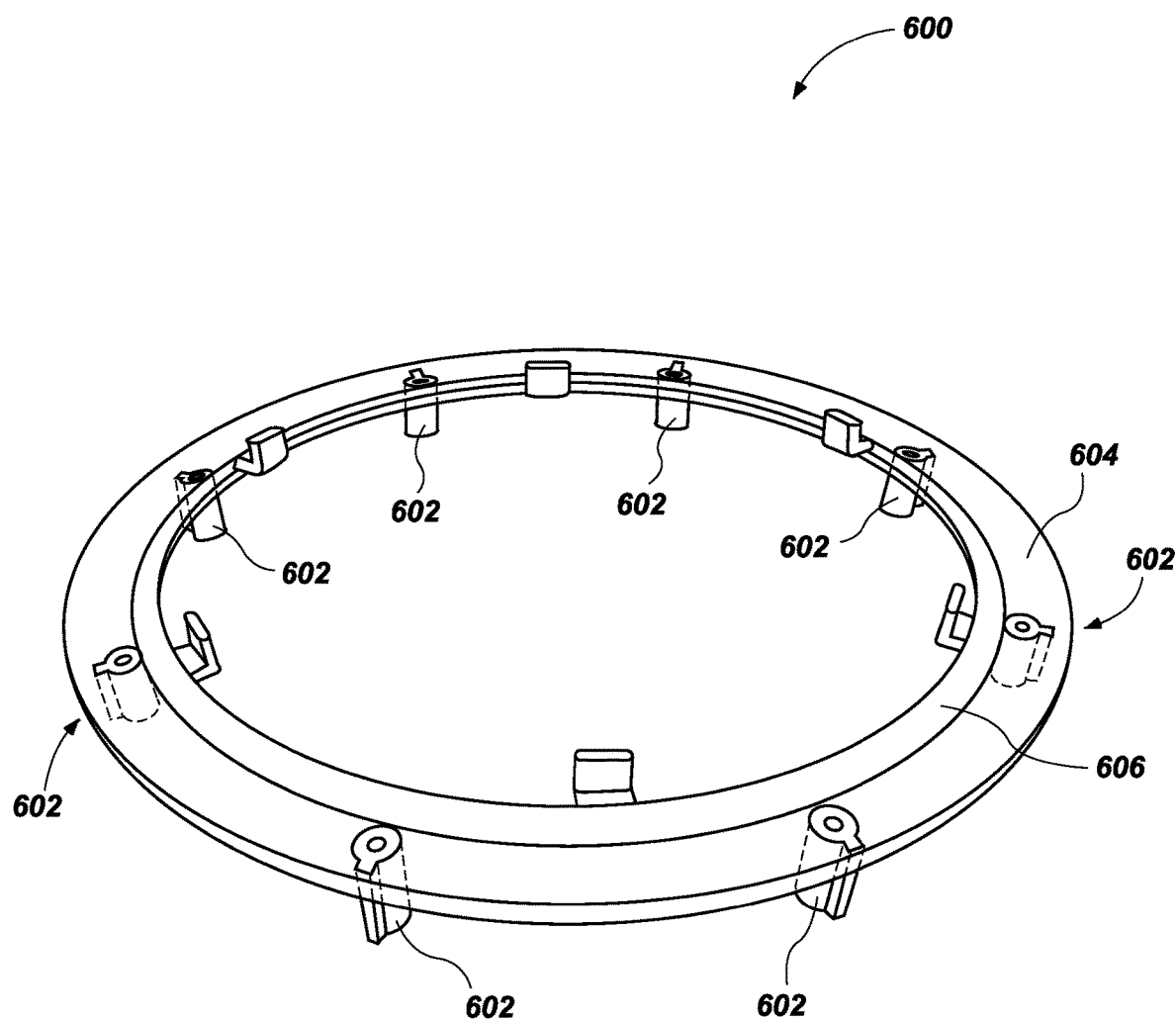
FIG. 6B is a top perspective view of the light pipe.
Figure 6C:
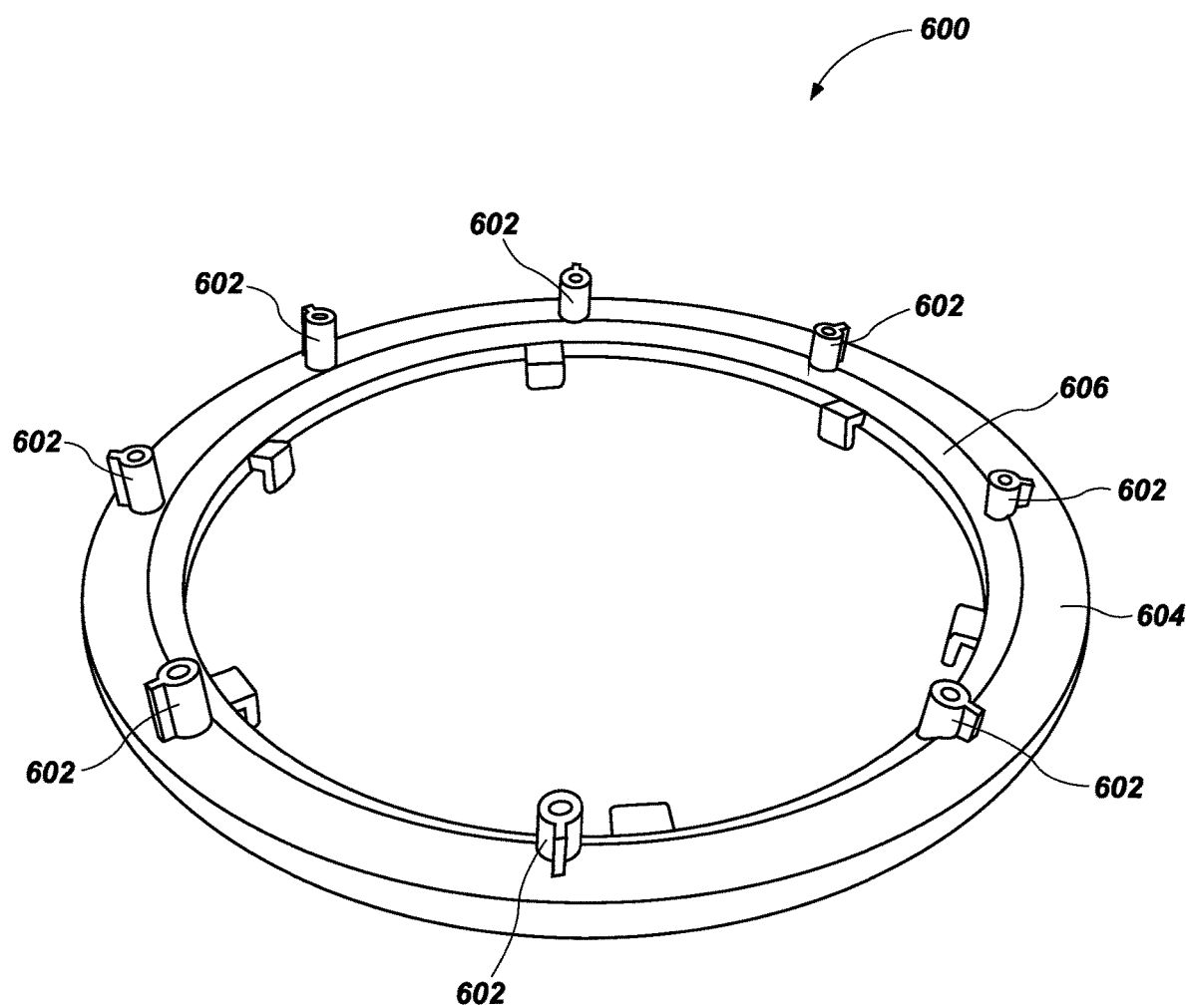
FIG. 6C is a bottom perspective view of the light pipe.

FIG. 6A is a top view of a light pipe 600 according to an embodiment of the disclosure. FIG. 6B is a top perspective view of the light pipe 600. FIG. 6C is a bottom perspective view of the light pipe 600. The light pipe 600 may be a generally annular structure (e.g., toroidal) configured to fit within the periphery of the backside of the lower portion 206 of the transparent housing 202 and align with the light sources 502 when the PCB 500 is positioned within the transparent housing 202.

The light pipe 600 may have posts 602 extending from its backside to complementarily engage with the posts extending from the backside of the lower portion 206 of the transparent housing 202. In some embodiments, the posts 602 may have different lengths to engage with the posts of the transparent housing 202. The different lengths may accommodate a slight slope in the shape of the transparent housing 202. The slope provides a tilt to the light pipe relative to the light sources for the light to exit the light pipe 600 orthogonal to the angled surface.

The light pipe 600 may be configured to distribute light generated from the backward facing light sources primarily out the sides of the visual indicator device 200. Pushing the light out of the sides may have the effect to better attract the attention of the hearing-impaired user. The annular portion of the light pipe 600 may include a flat surface 604 and an angled surface 606 relative to the flat surface 604. The angled surface 606 may be a beveled surface relative to the flat surface 606. In operation, the bevel captures the light and directs the light out of the sides of the translucent housing. In some embodiments, the angled surface 606 may be within a range of 30° to 45° relative to the flat surface 604. In another embodiment the range may be 30° to 37.5°. In another embodiment, the range may be 37.5° to 45°. Any angle within those ranges is also contemplated. The light pipe 600 may be formed from a plastic material (e.g., polycarbon, resin, etc.). In some embodiments, the light pipe 600 may utilize a polished mold to create a specular reflective surface. In some embodiments, the light pipe 600 may be translucent (e.g., clear). Additional materials, colors, finishes, textures, and coatings are also contemplated for the light pipe 600. Because the light pipe 600 performs the wave guiding features, complex mirrors or reflectors may be avoided as well as materials that may interfere with wireless signals. In some embodiments, the light pipe 600 may be configured to use total internal reflection to direct light outward.

Figure 7:
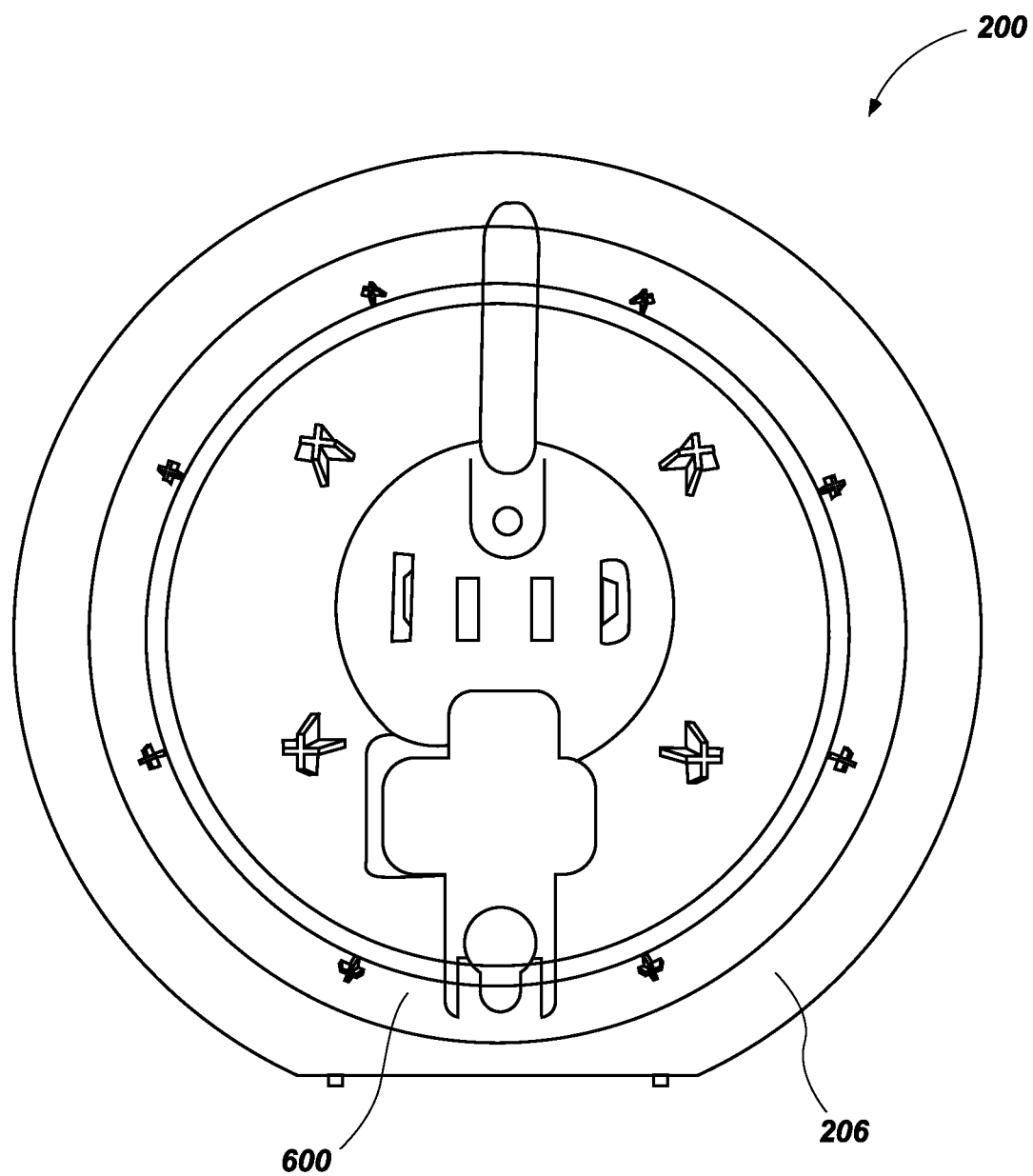
FIG. 7 is a top view of the lower portion of the transparent housing with the light pipe attached.

FIG. 7 is a top view of the lower portion 206 of the transparent housing 202 with the light pipe 600 attached. In particular, the posts 602 of the light pipe 600 are complementarily coupled with the posts 222 of the lower portion 206 of the transparent housing 202.

Figure 8:
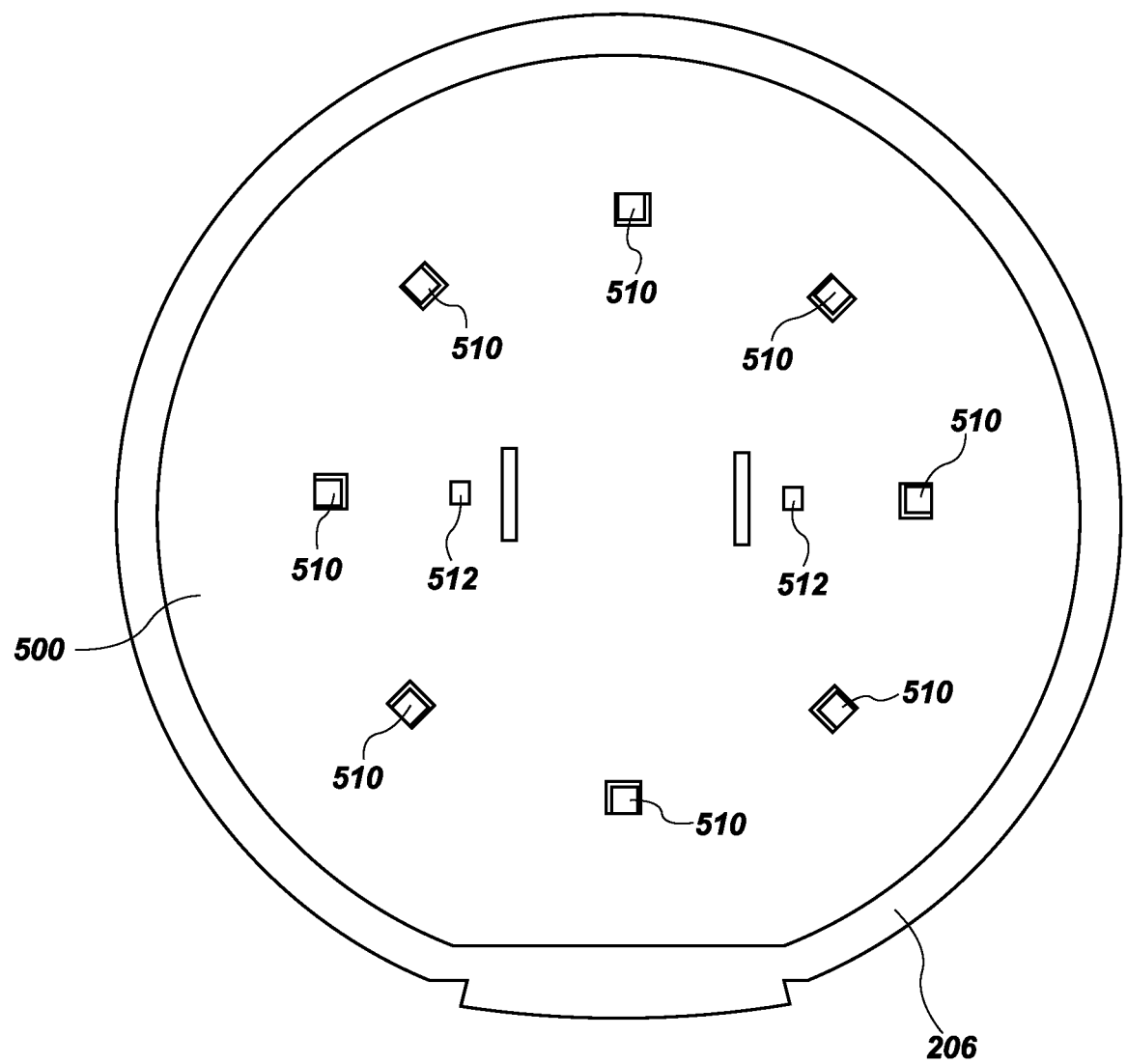
FIG. 8 is a top view of the lower portion of the transparent housing with the printed circuit board attached.

FIG. 8 is a top view of the lower portion 206 of the transparent housing 202 with the printed circuit board 500 attached. The printed circuit board 500 rests on top of the light pipe 600 with the face of the printed circuit board 500 directed to the backside of the lower portion 206 of the transparent housing 202 such that the light sources 502 are directed to the back of the visual indicator device 200 that faces the horizontal or vertical surface by which it is supported. The back of the printed circuit board 500 may include additional light sources 510, 512 that may perform additional functions such as lighting up when a message is available for review, a missed call has occurred, or other notification situation. With the printed circuit board 500 attached, the upper portion 204 of the transparent housing 202 may enclose the electronics as is shown in FIG. 1.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A visual indicator device for connection to a video communication device, the visual indicator device comprising:
   a transparent housing;
   a printed circuit board having a plurality of light sources mounted thereon; and
   a light pipe positioned within the transparent housing between a back surface of the transparent housing and the printed circuit board, the light pipe having a flat surface and an angled surface having a range between 30° to 45° relative to the flat surface and wherein the light pipe includes posts on a bottom surface configured to provide a standoff from the translucent housing.

2. The visual indicator device of claim 1, wherein the light pipe is formed from a plastic material.

3. The visual indicator device of claim 1, wherein light pipe is formed from a clear material.

4. The visual indicator device of claim 1, wherein the range is between 30° to 37.5°.

5. The visual indicator device of claim 1, wherein the range is between 37.5° to 45°.

6. The visual indicator device of claim 1, further comprising:
a processor configured to control the light sources to generate a light pattern responsive to a control signal received from a video communication device.

7. The visual indicator device of claim 1, further comprising:
a processor configured to control the light sources to generate a light pattern responsive to a control signal received from a video communication device.

8. The visual indicator device of claim 1, wherein the printed circuit board is disposed within the transparent housing such that the plurality of light sources faces backward toward a back surface of the transparent housing.

9. The visual indicator device of claim 1, wherein the light pipe is positioned to direct a primary amount of light out of a side of the transparent housing.

10. The visual indicator device of claim 9, wherein the light pipe is a generally annular shape.

11. A visual indicator system comprising:
a video communication device configured to receive an incoming call and transmit a control signal in response thereto; and
a visual indicator device configured to:
generate a light pattern with a plurality of lights mounted on a backward facing circuit board within a translucent housing responsive to the control signal; and
guide light from the light pattern through a light pipe to exit primarily through a side of the translucent housing, wherein the light pipe includes posts on a bottom surface configured to provide a standoff from the translucent housing.

12. The visual indicator system of claim 11, wherein the light pipe is a toroidal shape having a flat surface and an angled surface relative to the flat surface.

13. The visual indicator system of claim 11, wherein the posts are configured to detachably couple from mating posts of the translucent housing.

14. The visual indicator system of claim 11, wherein the posts have different lengths to provide a tilt in an orientation of the light pipe relative to the light sources.

15. A method of generating a visual notification responsive to an incoming call, the method comprising:
receiving an incoming call at a video communication device configured for use by a hearing-impaired user;
transmitting a control signal to a visual indicator device responsive to the incoming call;
generating a light pattern with a plurality of light sources within a housing of the visual indicator device; and
guiding the light pattern with a light pipe having a flat surface and an angled surface to exit the housing primarily through a side surface thereof, wherein the light pipe includes posts on a bottom surface configured to provide a standoff from the translucent housing.

16. The method of claim 15, wherein generating the light pattern is performed by the plurality of light sources oriented in a backward direction relative to a front surface of the housing.

17. The method of claim 16, wherein transmitting the control signal is performed over a wireless communication link between the video communication device and the visual indicator device.

18. The method of claim 15, wherein the light pipe is a clear plastic material.

19. A visual indicator system comprising:
a video communication device configured to receive an incoming call and transmit a control signal in response thereto; and
a visual indicator device configured to:
generate a light pattern with a plurality of lights mounted on a backward facing circuit board within a translucent housing responsive to the control signal; and
guide light from the light pattern through a light pipe to exit primarily through a side of the translucent housing, the light pipe comprising a flat annular surface.

* * * * *